Aug. 8, 1939.  L. MYERS  2,168,430
JUICE EXTRACTOR
Filed Oct. 6, 1934   3 Sheets-Sheet 1

Inventor
Louis Myers,
By Semmes & Semmes attys.

Aug. 8, 1939.　　　　L. MYERS　　　　2,168,430
JUICE EXTRACTOR
Filed Oct. 6, 1934　　　　3 Sheets-Sheet 2

Inventor:
Louis Myers,
By Semmes & Semmes attys

Aug. 8, 1939.                L. MYERS                2,168,430
                           JUICE EXTRACTOR
                        Filed Oct. 6, 1934           3 Sheets-Sheet 3
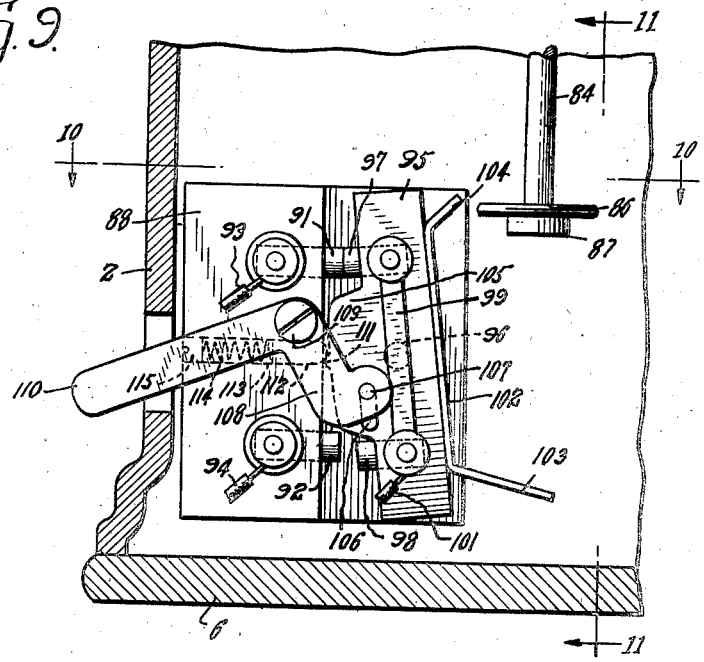
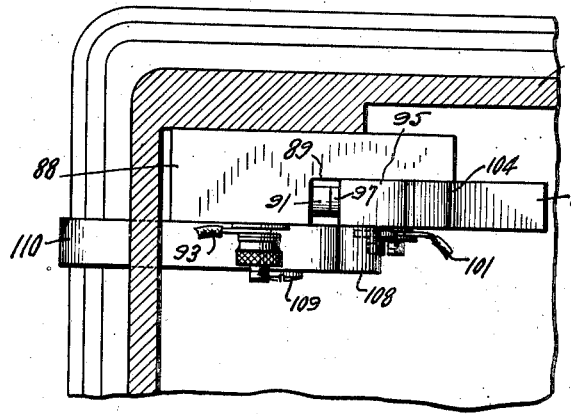
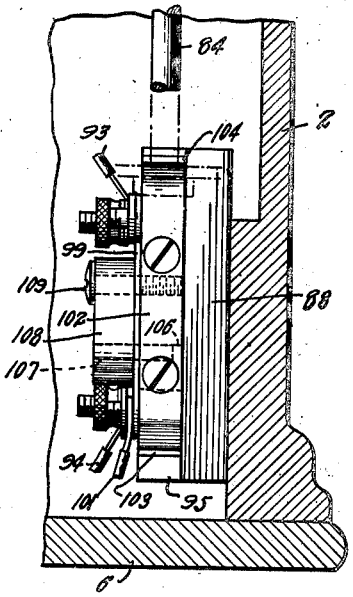
Inventor:
Louis Myers,
By Semmes & Semmes attys.

Patented Aug. 8, 1939

2,168,430

UNITED STATES PATENT OFFICE 2,168,430

JUICE EXTRACTOR

Louis Myers, Galesburg, Ill.

Application October 6, 1934, Serial No. 747,228

3 Claims. (Cl. 100—44)

This invention relates to juice extractors, and more particularly has reference to a device for expressing the juice of fruits, such as citrus fruits.

The prior devices of this general character have taken various forms, such as rotatable means for de-pulping one-half of a citrus fruit, pivoted members for squeezing a half of a fruit to express the juice, and in some instances means for simultaneously cutting and squeezing an entire fruit. All such prior devices, however, have presented certain objectionable features.

In most instances, an inordinate amount of manual labor is involved in the operation of the device, particularly where it is necessary to first cut the fruit prior to the operation of the device. Even where the prior devices have automatically cut the fruit, there is usually a certain amount of pulp, seed and rind oil expressed along with the juice, thereby necessitating the straining of the juice. This has resulted from the fact that the knives employed heretofore for the cutting operation have passed entirely through the fruit, thus macerating the pulp and opposite portions of the rind.

Also, the prior devices have been dangerous in operation, and have been constructed with little regard for the safety of the operator. This is particularly true in the so-called "rotating" type of device, but the element of danger is also present in other forms.

Furthermore, the prior devices have been relatively insanitary, or rather, have been difficult to cleanse. This has resulted from the construction of such prior devices, and particularly from the fact that the parts exposed to the fruit and juice have not been capable of ready disassembly in order to thoroughly wash and soak such parts.

There has also resulted some loss of juice with most of the prior devices, inasmuch as there has been a tendency for the juice to squirt upwardly and out of the device, and even where the device is of the compression type the juice is apt to leak by the upper compression member.

In addition to the labor involved in manually slicing the fruit, as mentioned above, all the prior devices have required an operator in constant attendance. In other words, it has been impossible for an operator to insert a whole fruit in the apparatus and then merely turn a switch to complete the operation. Furthermore, the fruit, after expression of the juice, has not been readily removed from the prior devices.

Another objection to devices heretofore used has resided in the fact that they are constructed for the purpose of operating upon an average fruit, and there has been no means of accommodating fruits of other sizes or characteristics, such as, for instance, thickness of the rind, resiliency of the fruit, etc.

To overcome the above disadvantages is one of the objects of my invention.

Another object of my invention is to devise an apparatus which is entirely automatic in operation, into which the fruit may be readily fed and removed.

Yet another object of my invention is to provide a relatively inexpensive device constructed in accordance with simple and sound mechanical principles, and which possesses a long life of operation.

Still another object of my invention is to provide a sanitary device in which the exposed parts may be readily cleansed.

With these and other objects in view which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 4 is a top plan view of the cup for holding the fruit.

Figure 5 is a top plan view of the knife cup.

Figure 6 is a detail view, taken along the line 6—6 of Figure 5, showing the cooperation of the fruit cup and knife cup.

Figure 7 is a view along the line 7—7 of Figure 3.

Figure 8 is a detail view of the guiding means for the plunger.

Figure 9 is a detail elevational view of the switch mechanism, with the switch in position for the commencement of a squeezing operation.

Figure 10 is a view along the line 10—10 of Figure 9.

Figure 11 is a view along the line 11—11 of Figure 9.

I shall describe my invention with reference to its application to the squeezing of citrus fruits, but it will of course be obvious that it may operate upon other materials.

Figure 1:
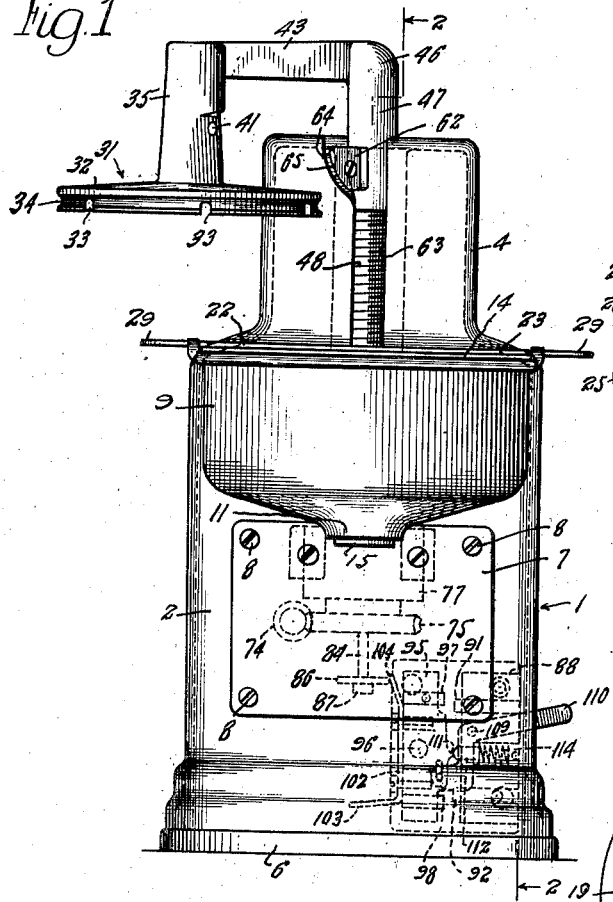
Figure 1 is a frontal elevational view of a device embodying my invention.

Referring particularly to Figure 1, it will be noted that there is provided a casing, designated generally by the numeral 1. The casing 1 is preferably made up from a light weight alloy, such as aluminum, or some other suitable material, which may be readily cleaned and polished. It will of course be appreciated that in a device of this character, sanitation is essential, and also it is desirable that the apparatus be readily maintained in a polished condition. The casing may be cast, or stamped, or formed in some other appropriate manner.

The casing 1 is preferably made up with a body portion 2. An extension 3 may be provided to the rear of the body portion 2 for the purpose of housing and supporting a motor, as hereafter described. Extending upwardly from the body portion 2 is a neck 4, which may be provided with a tapering rear wall 5.

The casing may be detachably secured to a base 6 (by suitable means not disclosed). Access to the interior of the casing may therefore be secured by merely removing the base from the casing. To further facilitate access to the interior, I provide a cut out section and a cover plate 7 therefor on the front of the body portion 2. The cover plate may be secured to the casing by means of screws 8 or some other suitable fastenings.

The casing 1 is formed with a cup or receptacle 9 extending from the front thereof. The cup 9 is provided with a central discharge outlet 11 and with a base 12 sloping toward such outlet.

A cup 13, which I designate the knife cup, and which is provided with a circumferential flange 14, is adapted to fit within the cup 9. It will be noted that the base of the cup 13 corresponds to the base 12 of the cup 9, and is provided with a central discharge port and an annular flange 15 which extends through the outlet port 11 of the cup 9.

The cup 13 is provided with a plurality of serrated knife blades, designated generally 16, which radiate from the outlet of the cup. As best shown in Figures 5 and 6, each of the knife blades is made up by bending a stamping to form a base portion 17, a perpendicular flange 18 and the blade proper 19. The base portion is secured to the knife cup 13 by means of rivets 21 or other suitable fastening means. It will be noted that while the base of the cup 13 slopes downwardly toward the flange 15, the blades 19 and flanges 18 are horizontal along their upper edges. Although these edges might be inclined, if desired, I have found it preferable to maintain them horizontal, so that the pressed fruit will be held flat, rather than concave or convex.

Figure 2:
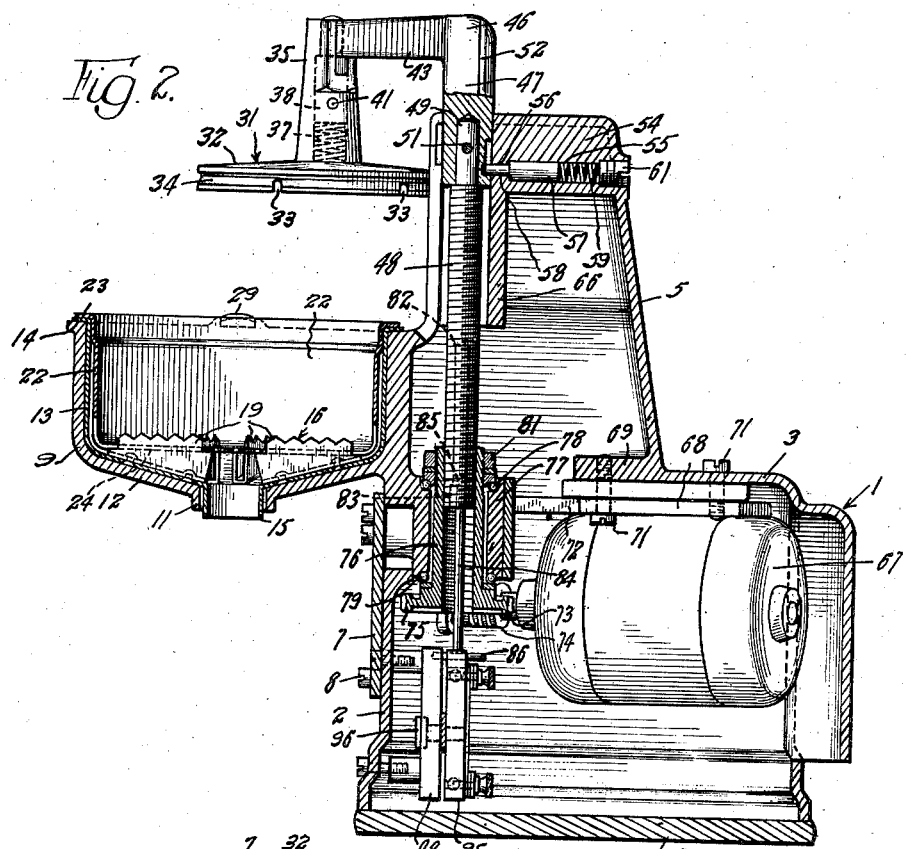
Figure 2 is a view partly in section and partly in elevation, taken along the line 2—2 of Figure 1.

A cup 22 is nested within the knife cup 13, and is provided with a flange 23 adapted to fit over the flange 14 of the knife cup. As best shown in Figure 2, the base 24 of cup 22 is flat.

In addition to the support offered by the flange 23, the cup 22 receives additional support by virtue of the flanges 18, as shown in Figure 6. It will be observed that the flanges 18 contact with the base 24 of the cup. As best shown in Figure 4, the base 24 is provided with slots 25 which register with the blades 19, and permit the passage of the latter therethrough, as shown in Figure 2.

It will be noted that the blades 19 project only a relatively short distance above the base 24 of the fruit cup, and in actual practice I prefer that this projection be not so great that the knives penetrate the entire thickness of the fruit, even when in flattened position. In other words, I prefer that the knives 19 merely pass through the lower rind and a slight distance into the pulp. This thereby prevents maceration of the pulp, and to that extent decreases the possibility of pulp and seeds being expressed along with the juice.

While I have shown six radial knives 16, and a corresponding number of radial slots 25, it will of course be obvious that these may be varied in number and in arrangement, under certain conditions.

The slots 25 may provide a certain amount of clearance with the blades 19, as shown in Figure 6, and thereby permit the outflow of a certain amount of juice from the cup 22 into cup 13. Additional outlets from cup 22, however, are provided by means of radial slots 26 and 27, as well as centrally arranged apertures 28.

I provide diametrically opposed ears 29 extending from the flange 23 in order to facilitate removal of the cup 22 from cup 13, and also to prevent the necessity of an operator touching that portion of the apparatus contacting with the fruit or expressed juices. The ears 29 fit into depressions or recesses in the cup 13 (not shown) in order to align slots 25 with blades 19. This of course provides a safety factor in the operation of the device.

It will be noted that the cups 13 and 22 may be withdrawn from the cup or receptacle 12, and also from each other. This of course permits of the ready cleansing of these parts of the device, and particularly to be noted in the ease with which the fruit, after expression of the juice, may be removed from the device. It is merely necessary to grasp one of the ears 29 and thereby remove cup 22 from cup 13, and the fruit may then be disposed of by merely turning the cup to an inverted position. This not only insures sanitation, but also provides a safety factor, inasmuch as there is no danger of injury to the operator because of the knives 16 or any of the moving parts.

I have provided a plunger, designated generally 31, which is adapted to cooperate with the elements just described to cut, squeeze and flatten any fruit to be acted upon. This plunger is composed of a disc 32 provided with recesses 33 upon its lower, and engaging, face, which are adapted to register with the knife blades 19. In normal operation the knife blades do not enter the grooves 33 and the grooves merely receive the upper part of the rind which is forced therein by virtue of the blades. In being so forced into the grooves 33, the upper part of the rind is normally ruptured, and thereby permits the flattening of the spherical rind. Another important function of the slots 33 is to receive the blades 19 in the event that the plunger is lowered when there is no fruit in the cup 22. This, of course, prevents breakage, or at least dulling, of the blades.

The disc 32 fits within cup 22 with a minimum amount of clearance. This is to prevent the escape of any juice upwardly and around the disc 32 during a squeezing operation. As a further insurance against such leakage, I provide an annular groove 34 in the side wall of disc 32. I have found in actual operation that the provision of such a groove effectively serves to prevent the escape of expressed juice around the plunger.

Extending from the upper face of disc 32 is a stem 35. As best shown in Figure 7, a channel 36 is drilled axially of the stem for the purpose of receiving means for locking the plunger to an operating arm. There is positioned in the lower part of the channel 36 a coil spring 37 having one end seated at the base of the channel and the other adapted to bear against a block 38 which is reciprocable in channel 36. The block 38 is cut away as at 39, and a pin 41 passes through the stem 35 and rests within the recess 39. It will be noted that the pin 41 thereby limits the reciprocation of block 38 within channel 36.

The upper end of block 38 is provided with an extension 42 which fits within a corresponding channel in an operating arm 43. A pin 44 passes through the arm 43 and the extension 42 to connect these two elements. The stem 35 is cut away, as at 45, to permit the stem 35 to be raised with respect to arm 43.

It will be noted from the foregoing that the plunger 31 is therefore cushioned in its mounting upon arm 43. The spring 37 normally holds the pin 41 at the base of recess 39, and consequently resiliently resists any upward displacement of the plunger 31 with respect to arm 43. Furthermore, it is to be noted that, even if the tension of the spring 37 should be overcome, the amount of such displacement is limited by the length of the recess 39. I have found that this arrangement provides sufficient flexibility so that my device may accommodate fruits of different sizes or characteristics, and also relieves the driving mechanism of undue loads imposed upon it at the bottom of a stroke of the plunger. If a fruit of undue size or of undue rind thickness is operated upon, the spring 37 flexes at the bottom of the plunger's downward stroke, thereby permitting the continuance of the arm 43 to its normal maximum lower position without the imposition of excessive strain upon the power mechanism. Of course, as soon as the pressure on plunger 31 is relieved, the spring 37 urges the plunger to the position shown in Figure 7. It will be appreciated that by varying the tension of the spring 37, an accurate control can be obtained over the pressure that is to be applied by the plunger.

The arm 43 is bent, as at 46, to form a neck portion 47. The arm 43 and neck 47 may be threaded for a portion of its length or, as shown in Figure 2, a separate threaded arm 48 may be secured to the neck 47. The threaded arm 48 may be provided with a reduced extension 49 which is adapted to fit within a channel drilled in the neck. A pin 51 may pass through the neck and reduced extension 49 to secure the same and to prevent rotation of the threaded arm with respect to the neck. It will, therefore, be noted that axial movement of the threaded arm 48 results in reciprocation of the plunger 31.

Figure 3:
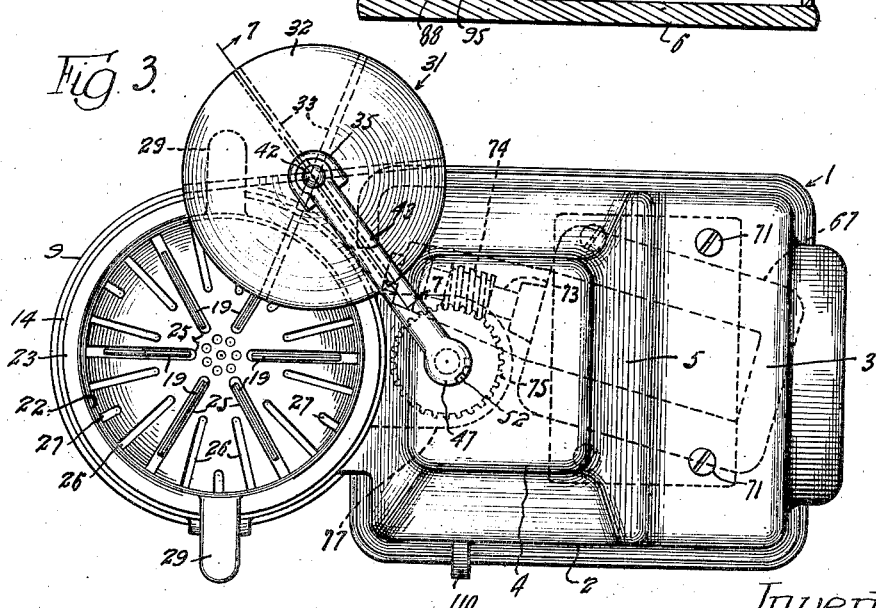
Figure 3 is a top plan view of my device.

It will be noted from Figures 1, 2 and 3 that the plunger 31, when in raised position, is swiveled out of alignment with the cup mechanism. The purpose of this, of course, is to facilitate the insertion of fruit in the cup and the removal of cups 22 and 13 from cup 9 when desired. By providing for the swiveling of the plunger, the extent to which it must be raised after a pressing operation is of course decreased.

To effect the swiveling of the plunger and to insure proper guiding for the plunger during its downward movement, I provide a slot 52 at the rear of the neck 47. As best shown in Figure 8, the slot 52 extends longitudinally of the neck 47 for most of its length, but at the base it is angularly disposed, as indicated at 53.

The upper part of the neck 4 is provided with a boss 54 which extends from the rear tapering wall 5. The boss 54 serves as a bearing for the neck 47. A channel 55 is drilled from the rear of the boss 54, and its forward portion is reduced as at 56. A pin 57 fits within the channel 55, and the pin has a reduced extension 58 which fits within the reduced channel 56, and extends into the groove 52 of the neck. The pin is maintained in proper position by a coil spring 59 which in turn is held in place by a screw 61 threaded in the rear end of the channel 55.

Further guiding means may be provided in the front of the neck 4 of the body member. As best shown in Figure 1, a block 62 may be mounted on the neck 47 directly under the arm 43. The block 62 is adapted to slide in a slot 63 cut in the front of the neck 4, thereby serving as a guide for the plunger during its reciprocation. It will be noted that the slot 63 is enlarged as at 64 to permit of the swinging of the arm 43 at the top of a stroke, and the block 62 may be provided with a face 65 which corresponds to the contour of such enlarged portion of the slot.

It will therefore be noted that during the major part of its reciprocation the plunger 31 is aligned with the cup 9, but that at the top of each stroke the plunger 31 swings to one side and out of alignment with the cup. This is of course effected by the reduced extension 58 of pin 57 running in the slot at the rear of the neck 47. During the lower part of reciprocation by the plunger the extension 58 will be in the longitudinally extending part of the slot 52, but when the plunger is raised to its upper limits the extension 58 rides in the angular part 53 of the slot 52, thereby swiveling the plunger 31 out of alignment with the cup. It will be noted that the boss 54 is provided with a downwardly depending skirt 66 which forms an elongated bearing or sleeve for the neck 47.

As best shown in Figure 2, an electric motor 67, or other suitable source of power, is supported by a bracket 68, which in turn is suspended from the top of the extension 3 of the casing. If desired, a flange 69 may extend inwardly from the casing in order to form additional support for the motor. Bolts 71, or other fastening means, may be employed to secure the motor in position.

As best shown by the solid lines in Fig. 2 and the dotted lines in Figure 3, the bracket 68 may be provided with an extension 72 in order to support a suitable bearing for the armature shaft 73 of the motor. A worm 74 may be keyed on the shaft 73 and adapted to mesh with a worm gear 75. The worm gear 75 is formed upon an interiorly threaded nut 76 which receives the threaded arm 48. The threaded nut 76 is journaled in a thrust bearing member 77 which extends from the front wall of body portion 2. The bearing member 77 is recessed at both ends, as at 78, in order to form ball races for ball bearings 79. The upper end of the nut 76 is threaded, and adapted to receive a nut 81 for the purpose of maintaining the nut within the bearing.

It will therefore be observed that operation of the motor 67, through the worm 74 and worm gear 75, causes a rotation of nut 76. Inasmuch as nut 76 is rotatively secured in the bearing 77, and in view of the fact that block 62 and extension 58 prevent rotation of arm 48, plunger 31 is raised or lowered, as the case might be.

The lower end of threaded arm 48 is provided with a centrally disposed channel 82, into the lower end of which a plug 83 may be screwed. The plug 83 is centrally drilled to receive a shaft 84, provided at one end with a plunger 85 which is adapted to slide in the channel 82. The plug 83 maintains the plunger 85 within channel 82, but permits of relative displacement therein. The lower end of shaft 84 is provided with a head 86 which is fixed on the shaft by means of a nut 87. The shaft 84, and its head 86, are adapted to actuate a reversible switch for the motor 67. The provision of shaft 84 effects an economy of space, for, as will be hereinafter seen, it is not necessary for the head 86 to move the same distance as plunger 31 in order to operate the switch.

The switch is made up of a block 88 which is secured to one wall of the body portion 2, as shown in Figures 9 and 10. The block 88 is recessed as at 89, and is provided with two stationary contact points 91 and 92. A wire 93 is connected to contact point 91, and a wire 94 is connected to contact point 92. Both of these wires run to the motor 67, and, as shown by Figure 9, wire 93 is connected to the motor so that the motor is rotated in a direction to lower the plunger. Wire 94, on the other hand, sets up a circuit whereby the motor is rotated in a direction to cause a raising of the plunger.

An arm 95 is pivoted in the recessed portion 89, as at 96. The arm 95 is provided with a contact 97 adapted to cooperate with contact 91, and a contact 98 adapted to engage contact 92. The contacts 97 and 98 are connected by a metallic strip 99, or some other suitable conductor, to which is connected one of the lead lines 101 from the source of power. The other lead line runs directly to one of the poles of the motor. Mounted upon the arm 95 is a bracket 102 provided with sloping arms 103 and 104. As shown in Figure 9, the arm 103 is longer than arm 104. When the arm 95 is pivoted so that contacts 91 and 97 engage, it will be noted that arm 103 lies in the path of head 86 on the latter's downward stroke; and when contacts 92 and 98 engage, arm 104 lies in the path of head 86 on its upward stroke.

Arm 95 is provided with an offset portion 105, in which there is an elongated slot 106. The slot 106 is adapted to receive a pin 107 which is secured to an arm of a bell crank 108. The bell crank 108 is pivoted to block 88, as at 109, and the arm 110 of the bell crank extends through the wall of the casing 2 to afford a lever that may be grasped by the operator. It will therefore be observed that arm 95 may be oscillated by the bell crank 108, so that either of the contacts 97 or 98 may be caused to engage its corresponding stationary contact.

The offset portion 105 is provided with a high point 111, which, when the arm 95 is in inoperative position, is horizontally aligned with pivot 96. In this position the high point 111 compresses a spherical-headed or bullet-shaped plunger 112, which lies within a channel 113 drilled in block 88. A coil spring 114 urges the plunger 112 into contact with high point 111, or the adjacent face of the offset portion 105. A nut 115 is threaded into the open end of channel 113 and maintains the spring 114 in position and under proper tension.

It will therefore be observed that when arm 95 is thrown from one position toward the other, the high point 111 first depresses plunger 112, and then, after passing beyond the plunger, the plunger springs the arm to the opposite position. Therefore, the high point 111 and plunger 109 provide for a snap-switching action. It will of course be appreciated that when the arm 95 is in neutral position the high point 111 merely depresses the plunger 112, and the switch remains in this position until the bell crank 108 throws either contact 97 or 98 into engagement with its corresponding stationary contact, to thereby start the motor in the desired direction of rotation.

The cooperation of the head 86 and arms 103 and 104 is believed to be apparent. Assuming that the plunger 31 is in retracted position, such as shown in Figure 1, the lever 110 may be depressed so that contact 97 engages contact 91. The motor is then started in a direction so that the plunger 31 is lowered. As the plunger 31 continues its downward movement, head 86 engages arm 103. However, it will be noted that the head 86 is in an overrunning connection with threaded arm 48, by virtue of channel 82. Therefore, the arm 95 is not immediately thrown upon initial engagement of the head 86 with arm 103.

It is not until the plunger 85 engages the upper end of channel 82 that the arm 95 is thrown. At such time as plunger 85 abuts channel 82, however, the arm 95 is thrown a sufficient distance so that high point 111 passes to the opposite side of plunger 109.

The spring tension on the plunger serves to throw the arm 95 so that contact 98 engages contact 92. This results in a reversal of the direction of rotation of the motor, and the plunger 31 thereby commences to rise.

When the plunger 31 has been elevated to such a position that head 86 engages arm 104, the pivoted arm 95 is again thrown so that contact 98 no longer engages contact 92. However, inasmuch as arm 104 is abbreviated, its engagement by head 86 is not sufficient to throw high point 111 beyond the center of plunger 112. In other words, when head 86 on its upward stroke engages arm 104, the switch is merely opened, but is not thrown sufficiently to reverse the motor. Therefore, the operation of the device is stopped with the plunger 31 in raised and swiveled position.

Of course, it is obvious that the motor may be stopped at any point in the operation of the device by merely throwing lever 110 so that high point 111 engages plunger 112. Likewise the motor may be started from any position of the plunger by throwing one or the other pair of contacts into engagement, depending upon the direction desired.

The operation of my device is believed to be apparent from the foregoing. With the plunger 31 initially in the positions shown in Figures 1, 2 and 3, a whole fruit, such as an orange, is placed in the fruit cup 22 and the lever 110 is depressed. This throws the switch so that contact 97 engages contact 91, and the motor 67 commences operation. Through worm 74, worm gear 75, and nut 76, the threaded arm 48 is lowered. At the commencement of the operation the extension 58 is in the slot 53, as shown in Figure 8, and in the initial lowering of the arm, the plunger 31 is swung so that it is directly over the cup 22.

As the plunger 31 engages the top of the orange, the knife blades 16 cut the rind at those points engaged by the knives. As pointed out above, the knives cut substantially only the lower part of the rind, but this is sufficient to permit the expression of juice from the orange. Continued pressure by the plunger 31 results in a flattening of the orange, and the upper part of the rind is broken along the lines described by the grooves 33 in the plunger.

The annular groove 34 prevents the escape of the orange juice past the plunger, and all of the juice passes downwardly through the slots 26 and 27 and the apertures 28 of cup 22. This juice, upon striking the sloping base of knife cup 13, flows toward the central discharge outlet and passes out through the flange 15 into the receptacle provided for the juice.

At the lower part of the downward stroke, the spring 37, which is located in stem 35, is compressed, and thereby cushions the plunger at the base of the stroke. This spring has a sufficient tension, however, to insure that there is an adequate and thorough pressing of the orange, and at the same time relieves the motor 67 and its associated gearing of any excessive strain, particularly when the orange may be of a size larger than usual. As heretofore pointed out, the pulp and seeds remain in the rind, and only the juice is expressed in the operation. This of course avoids the necessity of straining the expressed juice.

Toward the end of the stroke, the head 86 contacts with arm 103, and the plunger 85 at the opposite end of shaft 84 rides upwardly in the channel 82 until it abuts against the top of that channel. At this time the head 86 is pressed against the arm 103 with sufficient force so that the pivoted arm 95 is rocked so that high point 111 passes the center of plunger 109. The plunger, by virtue of spring 114, completes the throw of the switch so that contact 98 engages contact 92. This reverses the motor, and the plunger 31 is raised.

At the top of the upstroke the slot 53 and extension 58 cause the plunger 31 to be swung around to a position such as shown in Figure 1, so that it no longer lies over the cup 9. At the very top of the stroke, head 86 engages arm 104, causing the pivoted arm 95 to rotate so that contact of points 92 and 98 is broken. As pointed out above, arm 104 is not sufficiently long to throw arm 95 so that high point 111 passes to the opposite side of plunger 112. The throw is only enough to break the contact between points 92 and 98, and therefore the motor is merely stopped, rather than reversed. Of course, reversal of the motor at the top of the stroke may be effected by elongating arm 104 sufficiently.

The ease with which the flattened rind may be removed, and a fresh fruit inserted is believed to be obvious. It will merely be necessary to grasp one of the lips 29, and raise the cup 22 out of cup 13. Cup 22 may then be merely flipped to rid it of the rind, and may then be quickly reinserted into cup 13 together with a fresh fruit.

Upon completion of a pressing operation, or a series of such operations, the apparatus, and more particularly those parts contacting with the fruit or the juice, may be readily cleansed. To accomplish this it is merely necessary to remove the cups 22 and 13 and wash each of these separately. The cup 9 and the base of plunger 31 may also be easily washed in order to remove any portions of the juice or fruit that may adhere thereto. The device may therefore be maintained in a spotless condition at all times, thereby not only insuring the sanitation of the device but also maintaining its attractive appearance.

The advantages of my invention are believed to be obvious. In the first place, it will be noted that it is of comparatively simple construction, requiring a minimum of movable parts. The apparatus is built in accordance with sound mechanical principles, and there is comparatively little wear imposed upon the elements, and consequently little necessity for repairs or replacements.

Furthermore, the operation of the device is of the utmost simplicity, and possesses outstanding time and labor economies. Its principle of operation, the construction of the various elements, and the arrangement of parts, are such that no skill is necessary and a minimum of time is consumed in operating the device.

Its efficiency is of course apparent, for substantially all of the juice is expressed, and at the same time the pulp and seeds are retained within the rind of the fruit. As a consequence, pure juice, free from all foreign matter, is obtained.

The sanitation of the device is readily apparent, not only because of the ease with which it may be cleansed but also in view of the fact that the juice, as well as those parts touched by the juice, are not exposed to contact by humans.

Furthermore, safety of the operator is assured, inasmuch as it would be practically impossible for the operator to be injured in the operation of the device.

I will not attempt to enumerate the various changes and modifications that may be made in the structure of the elements and the arrangement. It will of course be obvious that various modifications may be made, all of which fall within the scope of my concept. I desire that my invention will be defined merely by the appended claims.

I claim:

1. In a device for extracting the juice of fruit, a receptacle and a plunger rectilinearly reciprocable therein, a cup member removably seated in the receptacle and provided with a blade extending longitudinally of the cup and located therein, another cup removably seated within the first mentioned cup member, said last mentioned cup being provided with an ear and having an approximately flat bottom, the plunger having an approximately flat bottom to substantially fit the bottom of the second mentioned cup, and supporting means in the bottom of the first mentioned cup member and rising therefrom to support the bottom of the second cup and prevent it from being bent downwardly by the pressure of the fruit.

2. In a juice extractor, a receptacle; a plunger rectilinearly reciprocable therein; a cup-like member having a substantially flat, radially slotted bottom removably seated in the receptacle; upwardly extending radial blades, circumferentially spaced, extending through the radial slots in the bottom of the cup-like member; and supporting means between the blades for supporting the bottom of the cup-like member.

3. In a juice extractor, a support; a receptacle projecting laterally therefrom, said receptacle having an inclined bottom provided with a discharge outlet at its lowest portion; a cup-like member fitting in and conforming to said receptacle and having a discharge outlet in alignment with the discharge opening in the bottom of the receptacle, said cup-like member having supporting units projecting upwardly therefrom to support the bottom of a second cup-like member, the first mentioned cup-like member also having upwardly projecting radial blades, circumferentially spaced, about the discharge opening; a second cup-like member located within the first cup-like member and having, in its bottom, radial slots, circumferentially arranged, and positioned to slide over the blades, the bottom of the second cup-like member being adapted to rest on and be supported by the upwardly extending supports projecting from the bottom of the first mentioned cup-like member; and a reciprocable plunger adapted to register with and reciprocate in the second cup-like member to force fruit against the upwardly projecting blades and squeeze the juice from the fruit.

LOUIS MYERS.